(12) United States Patent
Rueca et al.

(10) Patent No.: US 11,331,170 B2
(45) Date of Patent: May 17, 2022

(54) ABUTMENT FOR DENTAL IMPLANTS, PARTICULARLY FOR DENTAL INTERVENTIONS IN ASSISTED SURGERY

(71) Applicant: MEGAGEN IMPLANT CO., LTD., Daegu (KR)

(72) Inventors: Francesco Rueca, Rome (IT); Giuseppe Luongo, Rome (IT)

(73) Assignee: MEGAGEN IMPLANT CO., LTD.

( * ) Notice: Subject to any disclaimer, the term of this patent is extended or adjusted under 35 U.S.C. 154(b) by 97 days.

(21) Appl. No.: 16/760,904

(22) PCT Filed: Oct. 26, 2018

(86) PCT No.: PCT/IT2018/050208
§ 371 (c)(1),
(2) Date: Apr. 30, 2020

(87) PCT Pub. No.: WO2019/087223
PCT Pub. Date: May 9, 2019

(65) Prior Publication Data
US 2021/0177553 A1    Jun. 17, 2021

(30) Foreign Application Priority Data
Oct. 31, 2017   (IT) .................. 102017000123725

(51) Int. Cl.
*A61C 8/00*    (2006.01)
(52) U.S. Cl.
CPC .......... *A61C 8/0053* (2013.01); *A61C 8/0065* (2013.01)
(58) Field of Classification Search
CPC ... A61C 8/0048; A61C 8/0059; A61C 8/0062; A61C 8/0068; A61C 8/0071;
(Continued)

(56) References Cited

U.S. PATENT DOCUMENTS 3,732,621 A * 5/1973 Bostrom ................ A61C 8/005
433/174
4,793,808 A * 12/1988 Kirsch .................. A61C 8/0086
433/173

(Continued)

FOREIGN PATENT DOCUMENTS

| CN | 101815479 A | 8/2010 |
| CN | 105228553 A | 1/2016 |
| WO | 2017153976 A1 | 9/2017 |

OTHER PUBLICATIONS

International Search Report and Written Opinion for PCT/IT2018/050208, dated Jan. 29, 2019.

*Primary Examiner* — Ralph A Lewis
(74) *Attorney, Agent, or Firm* — Renaissance IP Law Group LLP

(57) ABSTRACT

The invention relates to an abutment (100), in particular for dental interventions in assisted surgery, comprising: —a first element (1), comprising a lower cylindrical element (2) and a semi-spherical element (3) integral above with said cylindrical element (2), divided into a plurality of segments, held together by an outer element (4), in the transition zone between said lower cylindrical element (2) and said semi-spherical element (3) there being provided, internally, a shoulder (7), said semi-spherical element comprising a thread (5), ending at said shoulder (7), in which a centrally perforated screw (6) is coupled, a plurality of steps or protrusions (8) being provided on said lower cylindrical element (2); —a second element (10), comprising a first upper cylindrical element (11), which inserts inside said cylindrical element (2) of said first element (1) and equipped externally with a plurality of steps or protrusions (12), which are able to move vertically with respect to staid plurality of steps or protrusions (8) provided on said cylindrical element (2), and a lower semi-spherical element (13); and —a third (Continued)

semi-spherical element (16), divided into a plurality of segments, and ending with coupling means (14) with a dental implant (15).

4 Claims, 1 Drawing Sheet

(58) Field of Classification Search
CPC ... A61C 8/0053; A61C 8/0054; A61C 8/0065; A61C 8/0066
See application file for complete search history.

(56) References Cited

U.S. PATENT DOCUMENTS

| | | | |
|---|---|---|---|
| 4,832,601 A * | 5/1989 | Linden | A61C 8/005 |
| | | | 433/173 |
| 5,302,125 A | 4/1994 | Kownacki et al. | |
| 7,214,063 B2 * | 5/2007 | Cohen | A61C 8/005 |
| | | | 433/173 |
| 8,684,733 B2 * | 4/2014 | McBride | A61C 8/006 |
| | | | 433/173 |
| 9,788,921 B2 * | 10/2017 | Clostermann | A61C 8/0048 |
| 10,993,787 B2 * | 5/2021 | Fischler | A61C 8/0065 |
| 2009/0202962 A1 * | 8/2009 | Xam-Mar Mangrane | |
| | | | A61C 8/0069 |
| | | | 433/173 |
| 2010/0291507 A1 | 11/2010 | Abdelgany | |
| 2021/0137649 A1 * | 5/2021 | Kirsch | A61C 8/0054 |

* cited by examiner

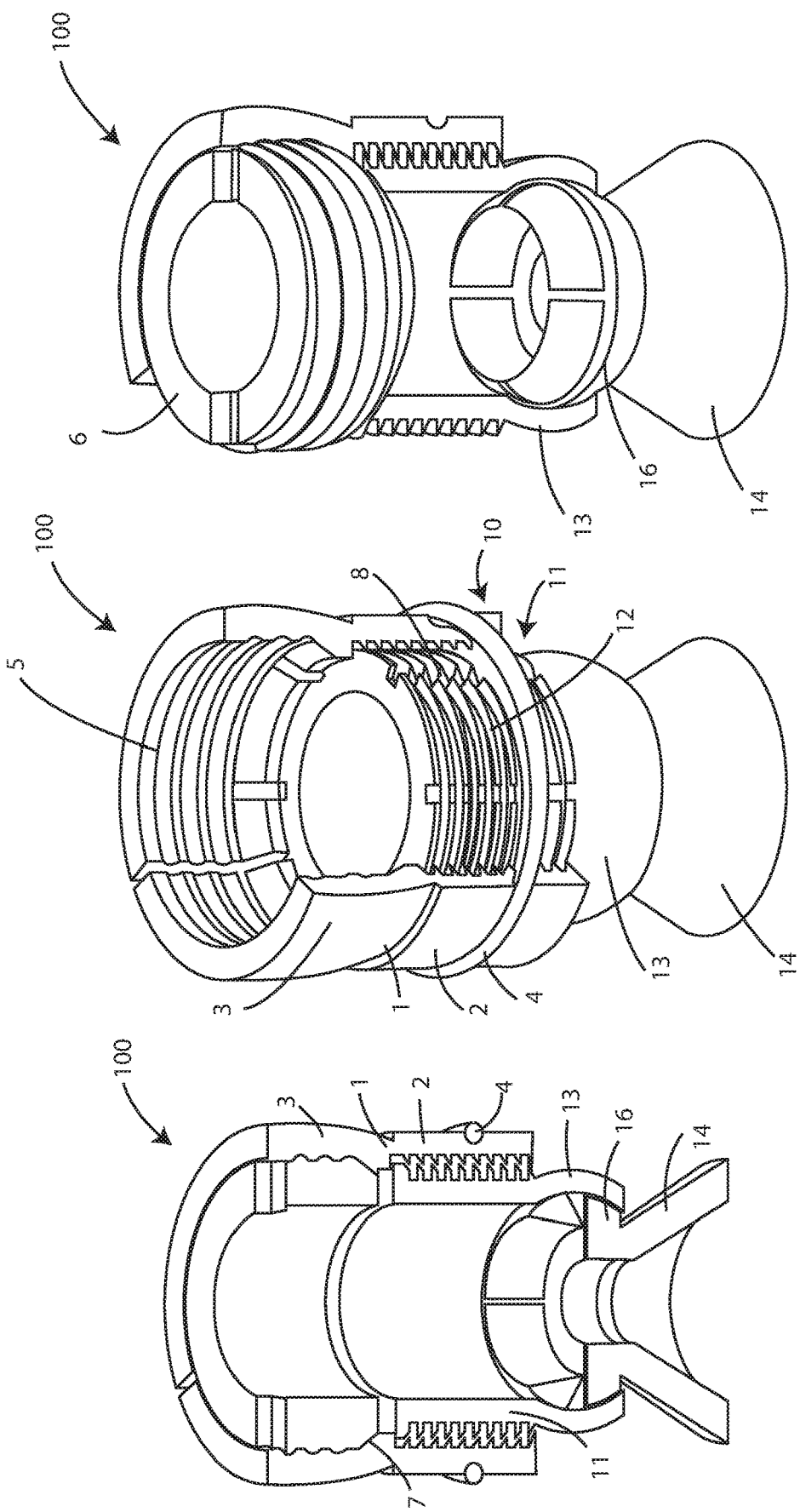

ABUTMENT FOR DENTAL IMPLANTS, PARTICULARLY FOR DENTAL INTERVENTIONS IN ASSISTED SURGERY

The invention relates to an abutment for dental implants, in particular for dental interventions in assisted surgery.

It is known how assisted surgery interventions have existed for many years amongst the dentistry techniques comprising:

collecting, by means of photographs and X-rays, the largest quantity of data concerning the mouth and the appearance of the patent;

constructing a virtual model of the oral apparatus by means of specific computer programs;

designing virtually, on the basis of said virtual model, one or more dental prostheses to be applied to the dental apparatus of the patient;

making the dental prostheses, for example from plastic material;

implanting the dental prostheses, by means of one or more abutments, in the oral apparatus of the patient.

This technique may be applied to any type of existing implant on the market.

It is also known how the implants are used for fixing dental prosthesis to the implant screws inserted beforehand in the bone.

According to the assisted surgery technique, the position on the gums and the orientation of the axis of said abutments are obtained by means of studies carried out on the virtual model of the mouth of the patient.

Other solutions known in the art were disclosed in documents U.S. Pat. No. 5,302,125 A, WO 2017/153976 A1 and US 2010/291507 A1.

However, this process has, in its practical application, various drawbacks, since between the virtual model and the actual mouth there are differences which are impossible to identify in the instrumentation examinations, such that the prostheses and the actual oral apparatus are different in certain details with respect to that seen in the virtual model.

This can lead to difficulties, every considerable ones, during fitting of the dental prostheses on the patient, such as, for example, misalignment between the actual position of the dental implants fitted and that planned during the design, slow-downs in the process, need to reposition one or more abutments.

In any case, these problems require a considerable experience and dexterity by the operator.

In light of the above, it is clearly necessary to provide an element which enables the above-mentioned problems to be overcome, thereby allowing a perfect application of the assisted surgery, without the need for too highly advance specialisation by the operator.

A first solution to this problem was proposed in Italian patent application No. 102015000061 of 14 Oct. 2015, which proposes an abutment of the said type comprising an upper body and a lower body, characterised in that it comprises at least one elastic element between said upper body and said lower body, to allow the movement of said lower body along the axes X, Y and Z, and in that it comprises a hole passing through said upper body, said at least one elastic element and said lower body, and in that it comprises a filler which blocks the abutment in the correct position.

However, this solution was also found to be not completely satisfactory for resolving the problem highlighted above.

The aim of this invention is therefore to overcome the drawbacks of the prior art, and in particular provide an abutment for assisted surgery dental operations which is able to compensate for any differences between the actual situation and the relative virtual model, thus allowing an easy application of assisted surgery technology in the dentistry field. The specific object of the invention is an abutment, in particular for dental interventions in assisted surgery, comprising:

a first element, comprising a lower cylindrical element and a semi-spherical element integral above with said cylindrical element, divided into a plurality of segments, held together by an outer element, in the transition zone between said lower cylindrical element and said semi-spherical element there being provided, internally, a shoulder, said semi-spherical element comprising a thread, ending at said shoulder, in which a centrally perforated screw is coupled, a plurality of steps or protrusions being provided on said lower cylindrical element;

a second element, comprising a first upper cylindrical element, which inserts inside said cylindrical element of said first element and equipped externally with a plurality of steps or protrusions, which are able to move vertically with respect to staid plurality of steps or protrusions provided on said cylindrical element, and a lower semi-spherical element; and a third semi-spherical element, divided into a plurality of segments, and ending with coupling means with a dental implant.

Preferably, according to the invention, said semi-spherical element of said first element is divided into a number of segments variable between three and six, preferably three segments.

Further, according to the invention, said outer element consists of a ring. Again according to the invention, said lower semi-spherical element is divided into four segments.

The present invention is now described, by way of example and without limiting the scope of the invention, according to its embodiment, with reference to the accompanying drawings. More specifically:

FIG. 1 is a transversal cross-section of an abutment according to the invention;

FIG. 2 is a first partial cutaway perspective view of the abutment of FIG. 1; and FIG. 3 is a second partial cutaway perspective view of the abutment of FIG. 1.

With reference to the drawings, in particular for assisted surgery interventions, the numeral 100 denotes in its entirety an abutment.

The abutment 100 comprises a first upper element 1, consisting substantially of a lower cylindrical part 2 and an upper semi-spherical part 3, divided, in the embodiment shown in the drawings, in three parts, held together by a ring 4. Obviously, the number of parts into which the upper element 1 is divided can be different to three, for example, four, five or six.

Said upper semi-spherical part 3 is equipped internally with a thread 5, on which a perforated screw 6 is screwed.

Again internally, in the transition zone between said lower cylindrical element 2 and said upper semi-spherical element 3, at the start of the thread 5, there is a shoulder 7.

Screwing or unscrewing said perforated screw 6, which interacts with said shoulder 7, will determine an opening or a closing, as required, of the first element 1.

The lower cylindrical part 2 has internally a series of steps 8.

The abutment 100 according to the invention comprises a second element 10, consisting at the top of a cylindrical part 11, which has externally a series of steps 12, corresponding to the steps 8 made on the lower cylindrical part 2 of the first element 1. Said cylindrical part 11 will have dimensions such as to be able to couple internally with the cylindrical part 2 of the first element 1, with the respective steps 8 and 12 which will allow the adjustment according to axis z.

Below, said second element 10 comprises a semi-spherical part 13.

There is also a third semi-spherical element 16, the semi-spherical part of which is divided into four parts (but the number of parts may be greater or less than four), which are housed in the semi-spherical element 13 of the second element. Beneath the third element 16 there is the mathematical seat 14 of the dental implant 15, which may be of any mathematical implant type on the market, or which will be put on the market in the future. When the screw (not shown) of the dental implant 15 is tightened, there ill be an expansion of the third semi-spherical element 16, so as to block its rotation-tilting.

The solution according to the invention achieves an abutment of the said type which is able to completely overcome the drawbacks of the prior art, sine its stability is guaranteed by mechanical forces.

The present invention is described by way of example only, without limiting the scope of application, according to its preferred embodiments, but it shall be understood that the invention may be modified and/or adapted by an expert in the field without thereby departing from the scope of the inventive concept.

The invention claimed is:

1. An abutment, for dental interventions in assisted surgery, comprising:
   a first element, comprising a lower cylindrical element and a first semi-spherical element that is integrally joined above said lower cylindrical element,
      wherein said first element is divided into a plurality of parts held together by an outer element extending around the plurality of parts of the first element,
      wherein said first semi-spherical element is provided with an internal thread on which a centrally-perforated screw is coupled with,
      wherein a transition zone between said lower cylindrical element and said first semi-spherical element at a beginning of said internal thread is provided with a shoulder,
      wherein said lower cylindrical element has internally a first plurality of steps; and
   a second element, comprising an upper cylindrical element and a second semi-spherical element,
      wherein said upper cylindrical element is externally provided with a second plurality of steps, said second plurality of steps corresponding to the first plurality of steps provided on the lower cylindrical element of said first element
      wherein said upper cylindrical element is dimensioned in such a way as to be coupled internally with the lower cylindrical element of said first element,
      wherein the first and second plurality of steps allow relative positioning of said first element with respect to said second element vertically along an axis Z; and
   a third semi-spherical element, divided into a plurality of parts which are housed in the second semi-spherical element, wherein said third semi-spherical element is terminated with means for coupling with a dental implant.

2. The abutment according to claim 1, characterized in that said first semi-spherical element is divided into a number of parts ranging from three to six parts.

3. The abutment according to claim 1, characterized in that said outer element is constituted by a ring.

4. The abutment according to claim 1, characterized in that said third semi-spherical element is subdivided into four parts.

* * * * *